United States Patent
Lee

(10) Patent No.: US 7,346,024 B2
(45) Date of Patent: Mar. 18, 2008

(54) APPARATUS AND METHOD FOR ACCESSING PRIVATE WIRELESS INTERNET PACKET DATA COMMUNICATION SYSTEM

(75) Inventor: Sung-Hoon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 938 days.

(21) Appl. No.: 10/259,818

(22) Filed: Sep. 30, 2002

(65) Prior Publication Data

US 2003/0063616 A1 Apr. 3, 2003

(30) Foreign Application Priority Data

Sep. 28, 2001 (KR) ............ 2001-0060831

(51) Int. Cl.
*H04Q 7/00* (2006.01)
(52) U.S. Cl. ..................... 370/328; 370/310
(58) Field of Classification Search ........... 370/310, 370/328, 329, 330, 352, 353, 354, 355, 356, 370/466, 467, 535; 455/33.1, 56.1, 53.1, 455/54.1, 54.2, 422, 426, 432.1, 433, 435.1, 455/552.1, 553, 554, 560, 445, 462, 465
See application file for complete search history.

(56) References Cited

U.S. PATENT DOCUMENTS

| | | | |
|---|---|---|---|
| 6,016,318 A | 1/2000 | Tomoike | |
| 6,405,040 B1 * | 6/2002 | Liu et al. ............... | 455/435.3 |
| 6,687,243 B1 * | 2/2004 | Sayers et al. ........... | 370/356 |
| 6,829,477 B1 * | 12/2004 | Lu et al. ............... | 455/426.1 |
| 6,950,415 B2 * | 9/2005 | Chang et al. ........... | 370/331 |
| 7,016,676 B2 * | 3/2006 | Walke et al. ........... | 455/434 |

(Continued)

FOREIGN PATENT DOCUMENTS

WO       WO 00/28752 A1        5/2000

(Continued)

*Primary Examiner*—Wellington Chin
*Assistant Examiner*—Mark A. Mais
(74) *Attorney, Agent, or Firm*—Robert E. Bushnell, Esq.

(57) ABSTRACT

An apparatus and method for accessing a private wireless Internet packet data communication system. A private packet data service apparatus includes a plurality of private BTSs positioned in an private packet data service zone and an private BSC for providing a wireless packet data service using a CDMA method. The private BTSs wirelessly communicate with terminals contained in a corresponding service zone. In the case where dialing numbers of calls requested by the private BTSs are not private packet service request signals, the private BSC transmits the calls to a public network BSC. In the case where dialing numbers of calls requested by the private BTSs are private packet service request signals, the private BSC provides the calls with a packet data service for which a non-authentication, a non-accounting, and an IP service are available. The private BSC includes a PDCC (Packet Data Call Controller), a PDTC (Packet Data Traffic Controller), and a PDMA (Packet Data Maintenance & Administration part). The PDCC generates or terminates an RP (Radio Packet) connection needed to perform packet data transmission/reception of a terminal between an AMC and a DCN (Data Core Network), and processes a state conversion concerning a packet call. The PDTC performs data transmission/reception between the AMC and the DCN. The PDMA performs an interface between a BAN and maintenance/administration blocks, checks states of the AMC and an ATM PVC, and checks a link state between the AMC and a DCN.

16 Claims, 11 Drawing Sheets

U.S. PATENT DOCUMENTS

| | | | |
|---|---|---|---|
| 7,120,135 B2 * | 10/2006 | Kim | 370/329 |
| 7,133,670 B1 * | 11/2006 | Moll et al. | 455/432.1 |
| 2001/0044903 A1 | 11/2001 | Yamamoto et al. | |
| 2001/0046224 A1 | 11/2001 | Ryu | |

FOREIGN PATENT DOCUMENTS

| | | |
|---|---|---|
| WO | WO 01/60085 A2 | 8/2001 |
| WO | WO 02/37876 A1 | 5/2002 |

* cited by examiner

APPARATUS AND METHOD FOR ACCESSING PRIVATE WIRELESS INTERNET PACKET DATA COMMUNICATION SYSTEM

CLAIM OF PRIORITY

This application claims priority under 35 U.S.C. §119 to my application entitled "APPARATUS AND METHOD FOR ACCESSING PRIVATE WIRELESS INTERNET PACKET DATA COMMUNICATION SYSTEM", filed in the Korean Intellectual Property Office on Sep. 28, 2001 and assigned Serial No. 2001-60831, the contents of which are hereby incorporated by reference.

BACKGROUND OF THE INVENTION

1. Field of the Invention

The present invention relates to a method for communicating with a wireless Internet access system, and more particularly to a wireless Internet data service method for a wireless Internet system within a prescribed zone such as an office zone and a private zone.

2. Description of the Related Art

Typically, a current radio communication system is implemented with a CDMA (Code Division Multiple Access) communication method. A CDMA2000 communication system will be available in the near future. For example, a CDMA2000 3G-1x system is going to provide a communication service at a speed of 144 kbps per second. In case of providing a high-speed communication service in such radio communication system, the use of a wireless Internet will rapidly increase.

However, in the case where there are very few users accessing a wireless Internet communication system and a user attempts to access a wireless Internet service within a prescribed area such as an office zone, expensive data communication devices, such as the public network wireless Internet system, are ineffective. In addition, unnecessary charges may be assessed to even private (also called an office or local) wireless Internet users.

SUMMARY OF THE INVENTION

It is therefore an object of the present invention to provide a method for providing wireless Internet communication within a prescribed area such as an office zone.

It is also an object of the present invention to provide an apparatus for enabling wireless phones and terminals to access the Internet via a private or an office network, thereby avoiding authentication and accounting issues.

It is another object of the present invention to provide a method for providing a wireless Internet data communication service with a limited user service (i.e., a simple IP Internet/Intranet access) having a simple wireless Internet access procedure (i.e., a non-authentication service) in a prescribed area such an office zone, simultaneously with easing a system load therein.

It is further an object of the present invention to provide an apparatus and a method for providing private and public access to telephones and the Internet to wireless users that are ordinarily located within the range of a private or office wireless communication network.

It is yet another object of the present invention that the private or office network can determine whether a mobile station located within the office environment is making a public or a private call or is accessing the internet publically or privately by examining the number dialed by the mobile station.

These and other objects can be achieved by a system having a mobile station that communicates with a private BTS that is connected with a private BSC. The private BSC is connected to a public BSC. The private BSC is also connected with the Internet via a gateway enabling private access with the Internet from the mobile station. The novel private BSC includes, among other things, a device for discerning whether a number dialed by a mobile station in the private network needs public network services and whether the number dialed needs Internet connection.

The provision of a private packet data service apparatus for a private wireless Internet communication system includes a plurality of BTSs (Base Transceiver Systems) for allocating a wireless resource to terminals positioned in an office packet data service area, and performing a radio communication with the terminals and an office BSC (Base Station Controller) for providing a packet data service if calls requested by the private BTSs correspond to office packet service request signals, the office BSC including: a BMP for processing a radio call, and determining if the requested call is an office call or public call by analyzing a phone number received from the terminal; an ATP-d (Air Termination Processorboard) for controlling a radio packet data and signals of the office BSC, and processing generation of them and a pPDP (private Packet Data Processor) connected between the office BSC and a DCN (Data Core network), for providing an office radio packet service, the pPDP including a PDCC (Packet Data call Controller) for allocating/releasing an IP (Internet Protocol) needed to establish packet data transmission/reception of a terminal between an ATP-d and the DCN, managing generation/ termination of an RP (Radio Packet) connection, and converting a state concerning a packet call a PDTC (Packet Data Traffic Controller) for performing packet data transmission/ reception between the ATP-d and the DCN; and a PDMA (Packet Data Maintenance & Administration part) for checking an interface with the office BSC and a state of the interface.

Preferably, the private packet data service apparatus may include a plurality of office (or private) BTSs positioned in an office packet data service zone and an office (or private) BSC for providing a wireless packet data service using a CDMA method. The office BTSs wirelessly communicate with terminals contained in a corresponding service zone. In the case where dialing numbers of calls requested by the office BTSs are not office packet service request signals, the office BSC transmits the calls to a public network BSC. In the case where dialing numbers of calls requested by the office BTSs are office packet service request signals, the office BSC provides the calls with a packet data service for which a non-authentication, a non-accounting, and an IP service are available. The office BSC includes a PDCC (Packet Data Call Controller), a PDTC (Packet Data Traffic Controller), and a PDMA (Packet Data Maintenance & Administration part). The PDCC generates or terminates an RP (Radio Packet) connection needed to perform packet data transmission/reception of a terminal between an AMC (ATP Mac Control, ATP: Air Termination Processor) and a DCN (Data Core Network), and processes a state conversion concerning a packet call. The PDTC performs data transmission/reception between the AMC and the DCN. The PDMA performs an interface between a BAN and maintenance/administration blocks, checks states of the AMC and an ATM PVC, and checks a link state between the AMC and a DCN.

In accordance with another aspect of the present invention, there is provided a private packet data service method for a private wireless Internet communication system having a plurality of BTSs (Base Transceiver Systems) for allocating a wireless resource to terminals positioned in an office packet data service area, and performing a radio communication with the terminals, and an office BSC (Base Station Controller) for providing a packet data service if calls requested by the private BTSs correspond to office packet service request signals, the office BSC including a BMP for processing a radio call, and determining an office call or public call by analyzing a phone number received from the terminal, an ATP-d (Air Termination Processor board) for controlling a radio packet data and signals of the office BSC, and processing generation of them, and a pPDP (private Packet Data Processor) connected between the office BSC and a DCN (Data Core network), for providing an office radio packet service, the private packet data service method including the steps of allocating/releasing an IP (Internet Protocol) needed to establish packet data transmission/reception of a terminal between an ATP-d and the DCN, managing generation/termination of an RP (Radio Packet) connection, and processing a state concerning a packet call, performing data transmission/reception between an AMC and the DCN, and performing an interface between a BAN and maintenance/administration blocks, checking states of the AMC and an ATM PVC, and checking a link state between the AMC and the DCN, whereby if a dialing number of a call requested by the office BTSs is not an office packet service request signal, the call information is transmitted to a public network BSC, and if a dialing number of a call requested by the office BTSs is an office packet service request signal, the call receives a packet data service with a non-authentication, a non-accounting, and an IP service.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
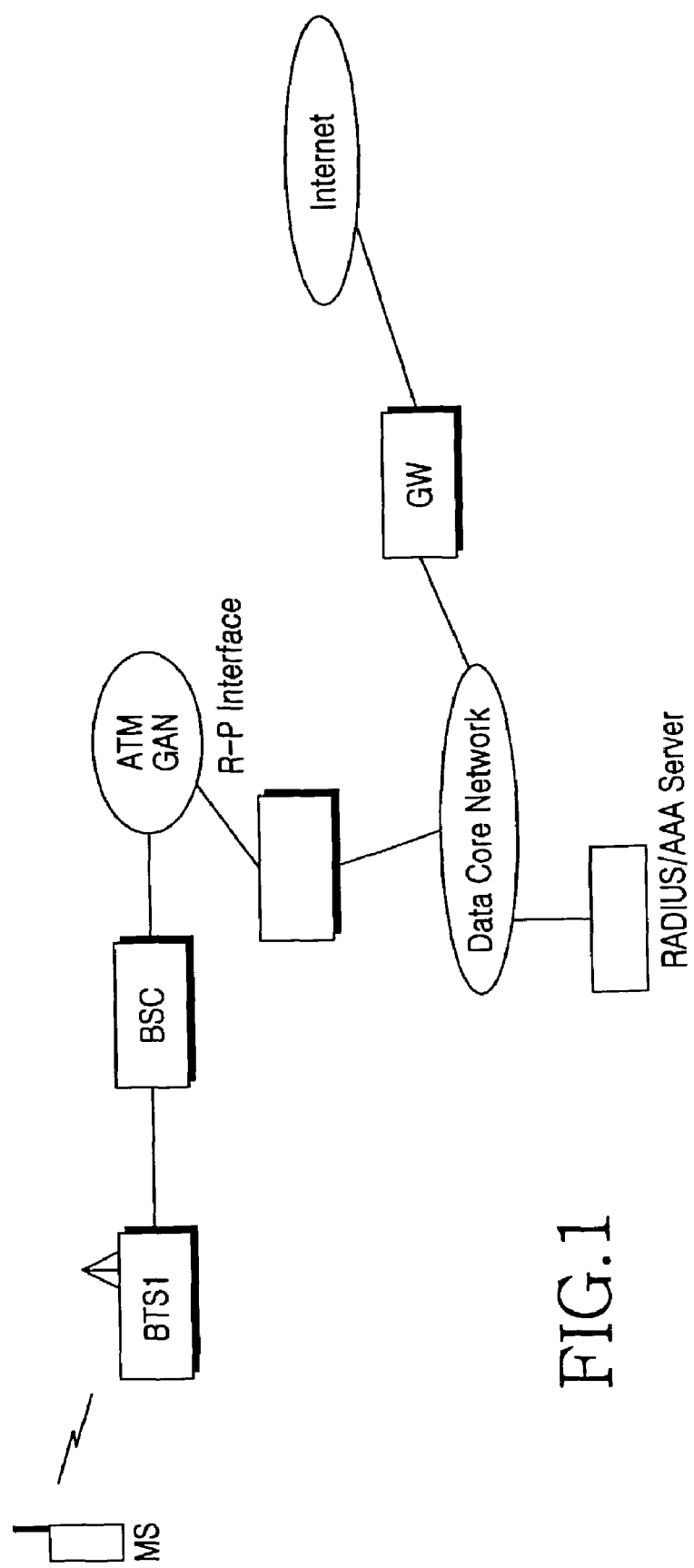
FIG. 1 is a view illustrating a block diagram of a wireless internet access network using a public network.

FIG. 1 is a view illustrating an exemplary diagram of a wireless Internet access network using a CDMA2000 3G-1x system of a public network. Referring to FIG. 1, a wireless Internet access network mainly comprises a RAN (Radio Area Network) and a DCN (Data Core Network). The RAN comprises a plurality of BTSs (Base Station Transceiver Systems) for wirelessly communicating with a plurality of mobile stations (i.e., mobile terminals) and a BSC (Base Station Controller) for controlling the BTSs, etc, and supports a high-speed communication service using an ATM (Asynchronous Transfer Mode) switching network as a backbone network. The DCN comprises a PDSN (Packet Data Service Node), a FAN, an AAA (Authentication, Authorization and Accounting), a home agent, etc., and performs a communication service over an Internet network. And, the DCN contains a PPP (Point-to-Point Protocol) module in a GAN (Global Area Network) in such a way that it is connected to the PDSN.

As described above, expensive data communication devices such as a PDSN and a DCN (e.g., AAA, FACN, etc.) besides the BTS and BSC are needed to provide a high-speed wireless Internet service. Also, the aforesaid public network wireless Internet service system performs an accounting action during user's communication, and thus charges a user (i.e., a subscriber) using a terminal MS (Mobile Station) a data service usage fee.

A preferred embodiment of the present invention relates to an office packet data service apparatus for an office private wireless Internet communication system. The private packet data service apparatus comprises a plurality of office BTSs positioned in an office packet data service zone and an office BSC for providing a wireless packet data service using a CDMA method. The office BTSs wirelessly communicate with terminals contained in a corresponding service zone. In the case where dialing numbers of calls requested by the office BTSs are not office packet service request signals, the office BSC transmits the calls to a public network BSC. In the case where dialing numbers of calls requested by the office BTSs are office packet service request signals, the office BSC provides the calls with a packet data service for which a non-authentication, a non-accounting, and an IP service are available. The office BSC comprises a PDCC (Packet Data Call Controller), a PDTC (Packet Data Traffic Controller), and a PDMA (Packet Data Maintenance & Administration part). The PDCC generates or terminates an RP (Radio Packet) connection needed to perform packet data transmission/reception of a terminal between an AMC (ATP Mac Control; where the ATP=Air Termination Processor) and a DCN (Data Core Network), and processes a state conversion concerning a packet call. The PDTC performs data transmission/reception between the AMC and the DCN. The PDMA performs an interface between a BAN and maintenance/administration blocks, checks states of the AMC and an ATM PVC, respectively, and checks a link state between the AMC and a DCN.

Herein, the PDCC generates or terminates an RP connection needed to perform packet data transmission/reception of a terminal between the AMC and the DCN, and processes a state conversion of a packet call. The AMC is in charge of a traffic channel concerning a packet call and a circuit call. The PDCC comprises an ARSD (ATP-RPP Signaling Daemon) processing part, a PCC (Packet Call Control) processing part, a PLR (Packet Location Register) processing part, a PPP (Point-to-Point Protocol) management processing part, and an IP (Internet Protocol) allocation processing part. The ARSD processing part processes messages related to a data service of a terminal, messages related to a time used in the PCC processing part, and messages used for processing the terminal's data in a dormant state. The PCC processing part controls a state of each packet call, and also controls a state transition of a corresponding terminal upon receiving a predetermined message. The PLR processing part manages state conversion information of a terminal by means of the PCC processing part, and transmits the state conversion information to each module in the form of a functional API (Application Program Interface). The PPP management processing part manages a PPP allocation and a PPP release. The IP allocation processing part performs an IP address allocation.

In the meantime, the PDTC performs packet data transmission/reception between the AMC and the DCN. The PDTC comprises an ARTD processing part (ATP-RPP Traffic Daemon), a data transmission part YAT (Yet Another Sending Task processing part), a PMI processing part, and a network processor pNA (pSOS+ Network Architecture processing part). The ARTD transmits a received data packet to a PMI task, requests a dormant paging, sets flags related to a program flow control, and initializes queues when terminating a dormant state in such a way that it processes signaling operations related to the AMC and traffic. The YAT manages a list of the queues, and transmits the queue message to the AMC. The PMI processing part receives LCP/IPCP/IP protocol frames from a terminal, and processes them. The network processor pNA performs an Ethernet packet communication with a DCN.

Figure 2:
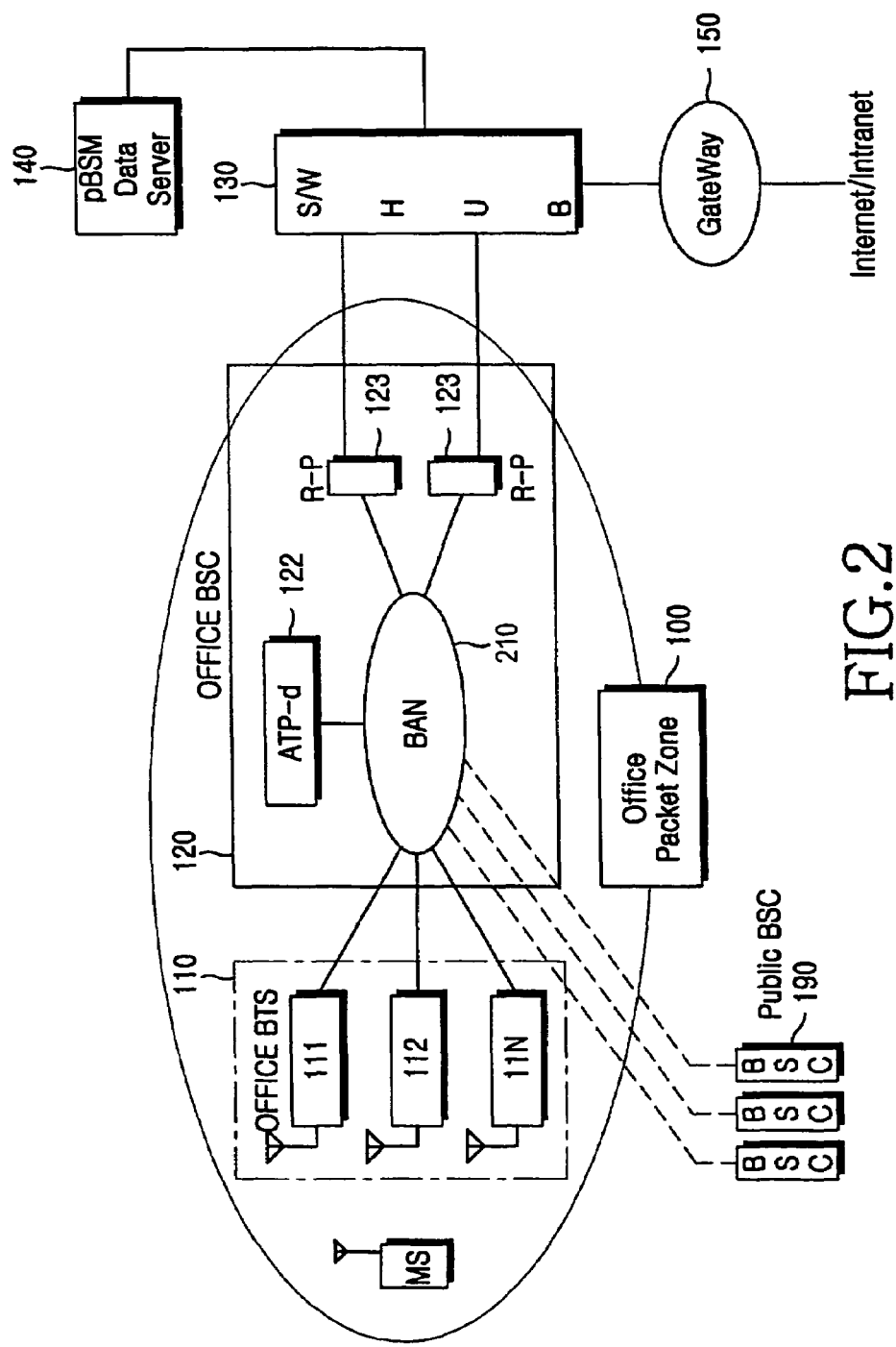
FIG. 2 is a view illustrating a software (S/W) block diagram of a private wireless Internet service system having a private wireless Internet packet service function and relevant interfaces thereof in accordance with a preferred embodiment of the present invention.

FIG. 2 is a view illustrating a software (S/W) block diagram of a private wireless Internet service system in accordance with a preferred embodiment of the present invention.

Referring to FIG. 2, an office packet zone 100 is an office (also called a private or local) wireless data network, and is composed of a plurality of office BTSs 111-11N and an office BSC 120 for controlling communication of the BTSs 111-11N. The office BSC 120 comprises a BAN (BSC ATM Network) 210 naming generically ATM paths inside of a BSC, an ATP-d (Air Termination Processor board) 122 functioning as a BSC hardware board on which RLP software (S/W) blocks are activated, and an RP (Radio Packet) connection 123 functioning as a BSC hardware board on which a S/W block for providing an office data function is activated. The office is BSC 120 is connected to a hub switch 130 functioning as a switching network device. A hub switch 130 is connected to a pBSM data server 140 and a gateway 150, etc. The pBSM data server 140 is a pBSM (private Base Station Maintenance) device, and is connected to the BAN 210 via the hub switch 130. A gateway 150 is a general network device, and is used as a transmission path in case of transmitting a packet to another network segment. The gateway 150 is connected to an Internet/Intranet, etc. The private Internet service system is connected to public network BSCs 190 in such a way that an office terminal user can use a public network wireless Internet service or radio voice communication service.

First, the office BTSs 111-11N communicate with a terminal MS to provide a radio communication service using a CDMA scheme. The BSC 120 controls a function of the office BTSs 111-11N. Herein, if the office BSC 120 receives a transmission signal of the terminal MS via the office BTSs 111-11N, it should be determined whether the MS requests a private wireless Internet or private voice communication service, or requests a public network Internet service or a public network voice communication service. For this purpose, according to a preferred embodiment of the present invention, the office BSC 120 distinguishes between a public network and an office Internet service by adopting user's dialing information received from the MS. In other words, a phone number for accessing a public wireless Internet service system and a phone number for accessing a private wireless Internet service system are differently allocated to the MS. A user of the MS attempts to access the Internet via an office network or public network phone number. Therefore, the office BSC 120 can discriminate between an office network service and a public network service on the basis of the received dialing number. In this case, there is no additional database to discriminate between them, and a packet data service using a public network BSC 190 and an office BSC 120 is determined using a number of called party (i.e., a call termination number field).

Also, the private Internet service system performs wireless packet data distribution without using a backbone network such as an ATM switch, allows a function of data devices, such as a PDSN (Packet Data Serving Node) and DCN, to be contained in an RPP inside of the office BSC 120 as a software function, and then processes packet data.

Figure 3:
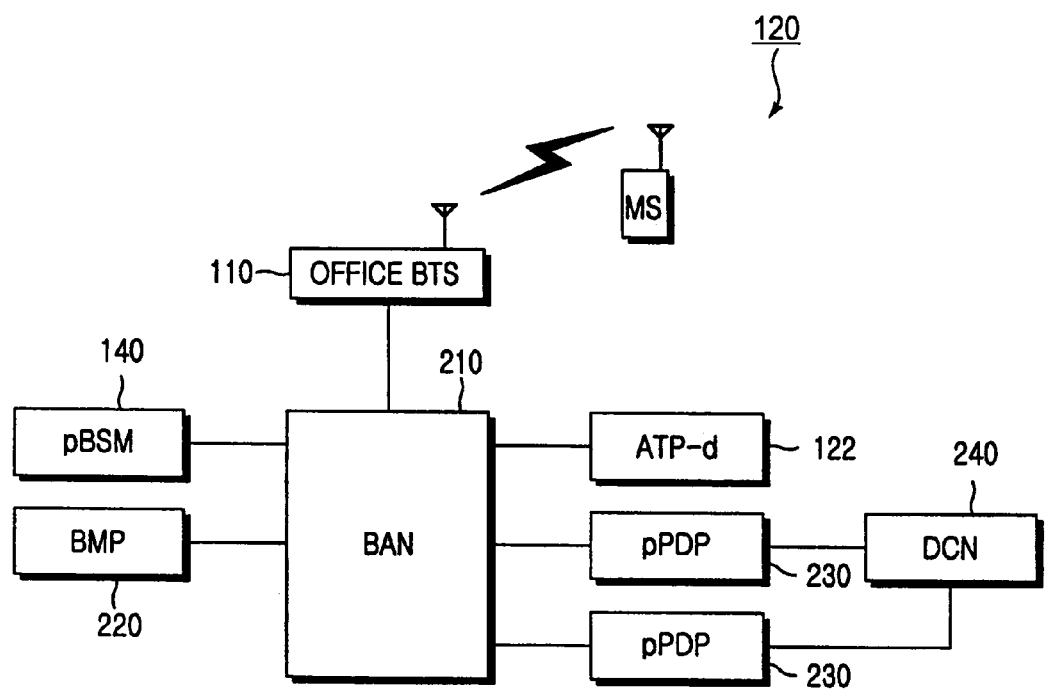
FIG. 3 is a view illustrating a software block diagram of a private wireless Internet service system having a private wireless Internet packet service function and relevant interfaces thereof in accordance with a preferred embodiment of the present invention.

FIG. 3 is a view illustrating a software block diagram of the office BSC 120 having a private wireless Internet packet service function in accordance with a preferred embodiment of the present invention. The software block contains a pPDP (private Packet Data Processor) 230 for controlling a message processing flow between tasks.

Referring to FIG. 3, a BAN (BSC ATM Network) 210 generically names all ATM paths inside of the BSC. The office BTS 110 communicates with a terminal MS to provide a radio communication service using a CDMA scheme, and allocates a wireless resource to the MS. pBSM 140 performs a maintenance function of an office wireless network, and manages registration information of a subscriber. ATP-d 122 controls radio packet data and signals, or processes generation of them, and therefore performs an RLP (Radio Link Protocol) processing function. BMP 220 is a BSC hardware board on which a software block for processing a radio call is activated, and performs a BTMR (Base Transmitter Message Router) function. The BMP 220 determines if the requested call is an office call or public call by analyzing a phone number received from the MS. The pPDP230 is a BSC hardware board on which a software block for providing an office data function is activated, and has the same function as the RP connection 123 of FIG. 2. Further, a DCN (Data Core Network) 240 generically names circuitries connected to a general LAN. In the preferred embodiment of the present invention, operations of a private wireless network will be described centering on the pPDP 230 shown in FIG. 3.

Figure 4:
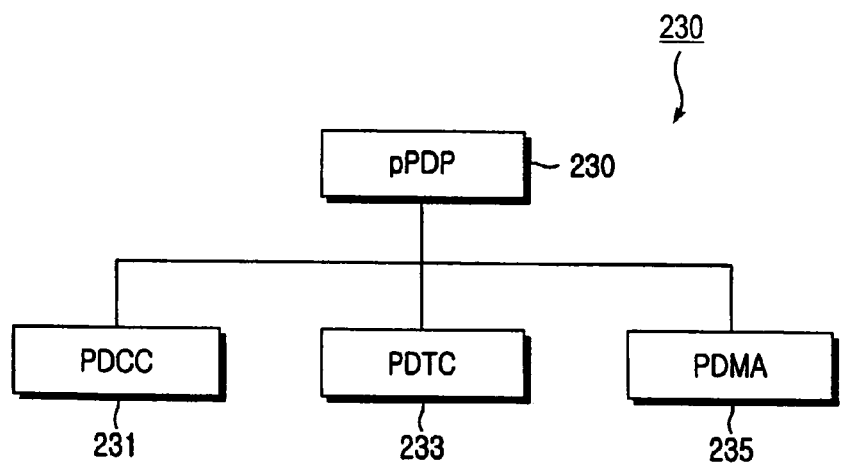
FIG. 4 is a detailed block diagram illustrating a pPDP block shown in FIG. 3, and illustrates internal tasks and procedures for signaling a private wireless packet data call in accordance with a preferred embodiment of the present invention.

FIG. 4 is a detailed block diagram illustrating the pPDP block 230 shown in FIG. 3 in accordance with a preferred embodiment of the present invention. The pPDP 230 includes a PDMA (Packet Data Maintenance & Administration part) 235, a PDCC (Packet Data Call Controller) 231, and a PDTC (Packet Data Traffic Controller) 233.

Referring to FIG. 4, the PDMA 235 is a module interfaced with O&M (Operation & Maintenance) function blocks of the BAN 210 shown in FIG. 3. Besides the interfacing with the O&M function blocks of the BAN 210, the PDMA 235 checks states of the AMC and an ATM PVC, and checks a link state between the AMC and the DCN 240 of FIG. 3. The PDMA 235 receives an IP address from the pBSM 140 and stores it, and performs a private Internet communication using the IP address in case of controlling a call. The PDCC 231 generates or terminates an RP (Radio Packet) connection needed to perform packet data transmission/reception of a terminal between the AMC and the DCN 240, and processes a state conversion concerning a packet call. That is, the PDCC 231 responds to a generated call to form a communication path of a packet data. The PDTC 233 performs packet data transmission/reception between the AMC and the DCN.

The pPDP block 230 has the following functions. Firstly, the pPDP block 230 controls an office packet call, and performs a state transition function. Secondly, the pPDP block 230 performs a PPP daemon function for providing a private wireless packet Internet service. Thirdly, the pPDP block 230 performs a traffic signaling (i.e., ARI flow control) function concerning a packet data, and also performs a PNA (Packet Network Architecture) function. Fourthly, the pPDP block 230 performs a dormant buffering function and a paging request function, and also performs a packet link registration function and a packet O&M function.

Figure 8:
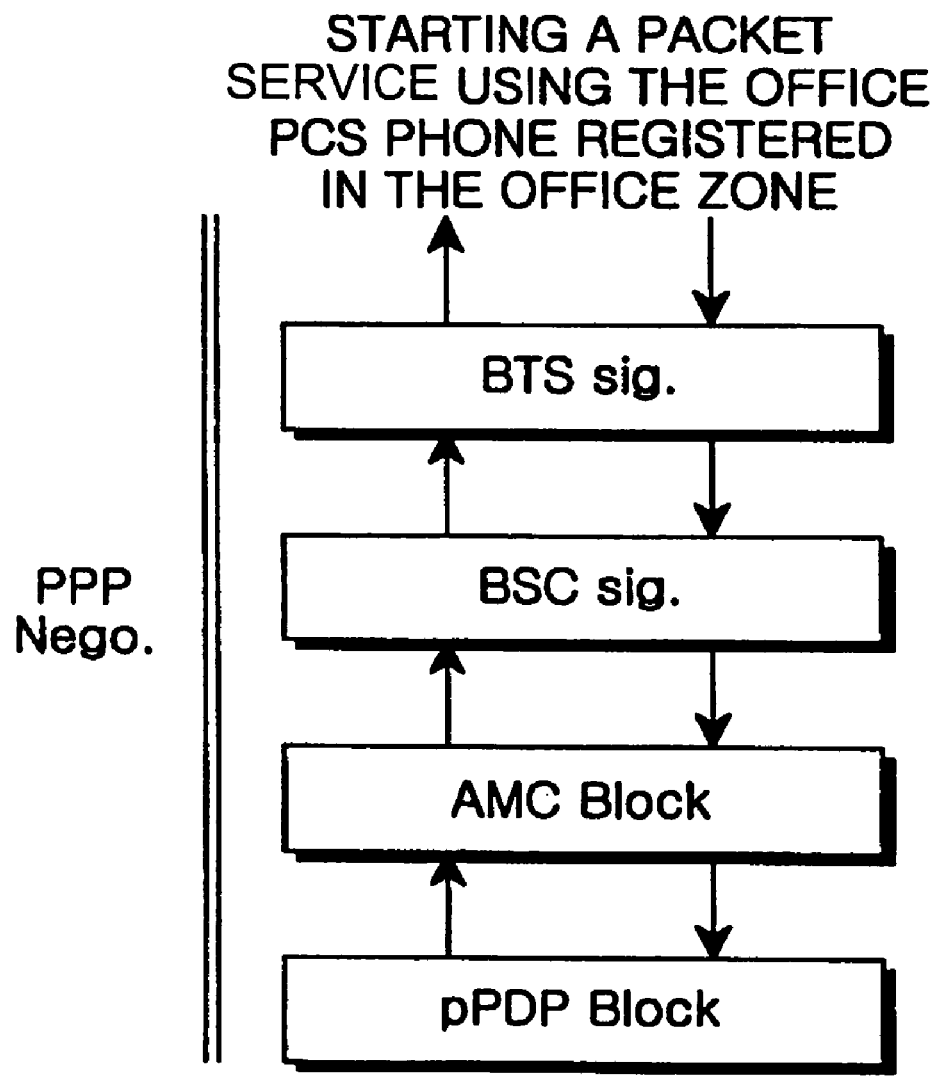
FIG. 8 is a flow chart illustrating a procedure for providing a private wireless Internet service in accordance with a preferred embodiment of the present invention.

FIG. 8 is a flow chart illustrating a procedure for providing a private wireless Internet service in accordance with a preferred embodiment of the present invention.

Referring to FIG. 8, a user of a private mobile terminal needs to register/load an additional service menu in his or her private mobile terminal to use a private wireless packet service. Thereafter, if there is a request signal from the user of the private mobile terminal, a BTS call control block (BTS Sig.) transmits the request signal to a BSC call control block (BSC Sig.). Then, the BSC sig. block determines whether the requested call is connected to a public network BSC 190 or an office network BSC 120. In this case, the determination is made on the basis of a field of the received dialing number information. If it is determined that the request call is connected to the office network BSC 120, the BSC sig. block informs an AMC block of connection information between the request call and the office network BSC 120, then the AMC block transmits the connection information to the pPDP block, thereby providing a private Internet service.

If a PPP setup is made between links (e.g., between a terminal or notebook computer and the pPDP block) denoted as double solid line in FIG. 8 after the aforesaid signaling procedure is normally terminated, the terminal or notebook computer is allocated an IP address. Then, the terminal or notebook computer can access a desired one of Internet and Intranet via the allocated IP address. Herein, the PPP is a general protocol, so its description will be omitted below, but its signaling process is the same as a data call signaling process of a CDMA2000 3G-1x. In accordance with the present invention, a procedure for discriminating between an office network and a public network is further needed.

As previously described in FIGS. 2-4, if a user gains access to a notebook computer using a CDMA2000 3G-1x terminal, or directly attempts to access the Internet via the terminal, an office BTS 110 allocates a wireless resource to a terminal MS, and the terminal MS and the office BTS 110 perform a radio communication using a CDMA scheme. The information transmitted from the terminal MS is transmitted to an office BSC 120 via the office BTS 110. Then, the office BSC 120 determines whether a user gains access to a private network or a public network system via a received dialing number (i.e., a called party). In this case, if a connection to a private Internet packet service system according to the present invention is determined, a service call signaling message is transmitted to the pPDP block of an office BSC 120, and packet access permission is granted to a terminal via a process flow between internal tasks shown in FIG. 5. Thereafter, a PPP protocol matching and user-service IP packet data transmission/reception are made via a traffic data process shown in FIG. 6.

Figure 5:
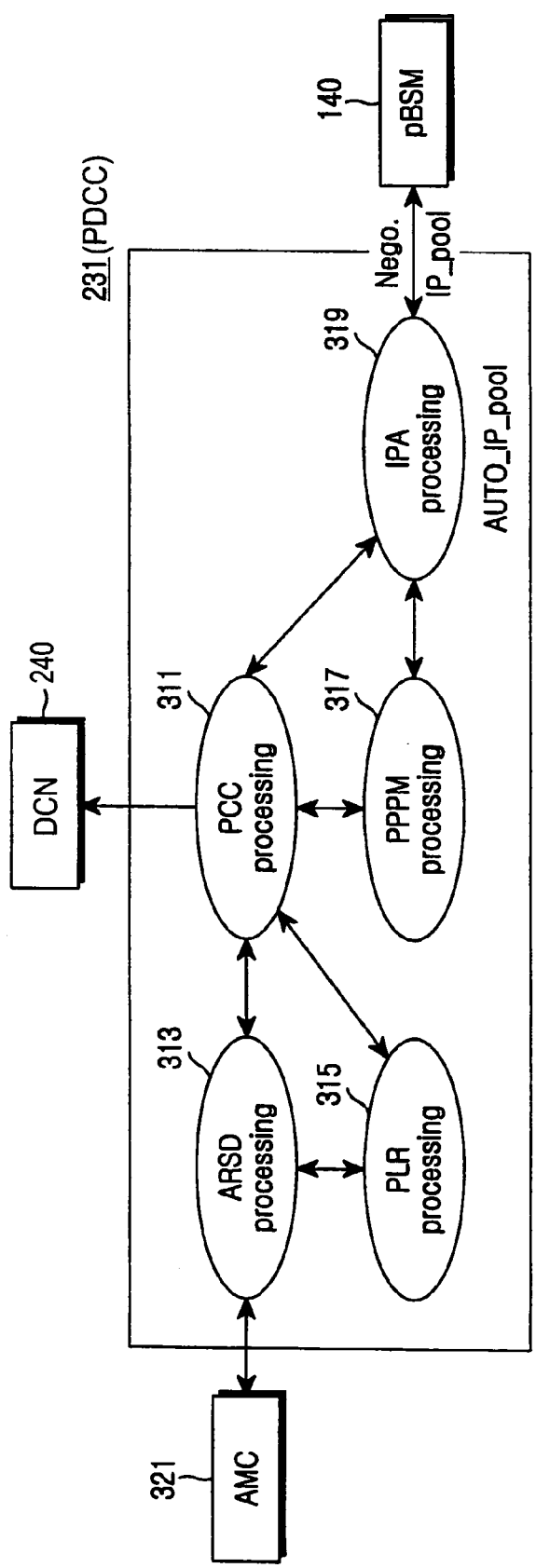
FIG. 5 is a view illustrating internal tasks and procedures for processing traffic data (i.e., a PPP frame) generated after a signaling process in accordance with a preferred embodiment of the present invention.

FIG. 5 is a view illustrating an interface configuration between a PDCC 231 shown in FIG. 4 and external blocks in accordance with a preferred embodiment of the present invention.

Referring to FIG. 5, the PDCC module 231 generates or terminates an RP (Radio Packet) connection needed to perform packet data transmission/reception of a terminal between the AMC 321 and the DCN 240, and processes a state conversion concerning a packet call. The AMC 321 is a software block inside of the ATP-d board 122 for processing traffic process concerning a packet call and a circuit call.

The ARSD processing part 313 processes messages (e.g., start/stop/restart/termination/accounting messages) related to a data service of a terminal, messages (i.e., timer expired message) related to a timer used in a PCC processing part 311, and messages (i.e., paging/data send message) used for processing the terminal's data in a dormant state.

The PCC (Packet Call Controller part) 311 controls all calls. A single mobile session (i.e., a packet call) has a corresponding state, and performs a state transition of a received message. The PCC 311 performs a state transition step for one mobile session. A current state is registered in a PLR processing part 315, and a state transition is carried out by only the PCC 311. The PCC 311 performs an error process concerning an erroneous message. The PLR (Packet Location Register processing part) 315 manages all state information for the pPDP 230, stores the information in its own PLR (Packet Location Register), and transmits the information to each module in the form of a functional API. The PPPM (PPP Management processing part) 317 manages the PPP. The IPA (IP Allocation processing part) 319 performs an IP allocation.

Figure 6:
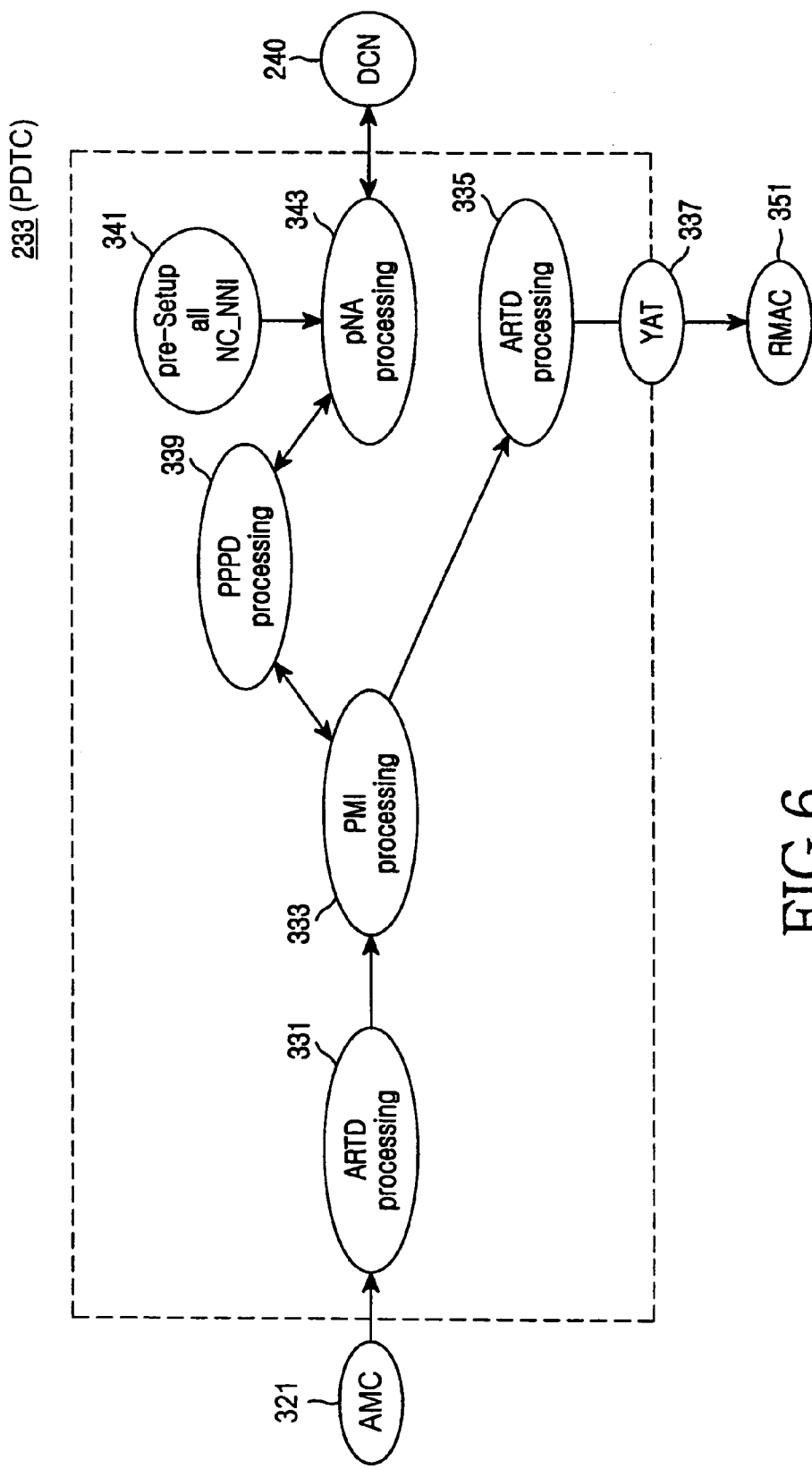
FIG. 6 is a view illustrating internal tasks for processing format management information concerning the inventive blocks, diagnosing the blocks, and processing a program interruption in accordance with a preferred embodiment of the present invention.

FIG. 6 is a view illustrating an interface configuration between a PDTC 233 shown in FIG. 4 and external blocks in accordance with a preferred embodiment of the present invention.

Referring to FIG. 6, the PDTC 233 is in charge of data transmission/reception between the AMC 321 and the DCN 240. The PDTC 233 includes an ARTD (ATP-RPP Traffic Daemon processing part) 331 functioning as a task for processing the AMC 321 and a signal related to traffic, a YAT (Yet Another (Sending) Task) 337 functioning as a task for transmitting traffic to the AMC 321, a PMI functioning as a task for receiving/processing LCP/IPCP/IP protocol frames, and a pNA (pSOS+ Network Architecture) for performing an Ethernet packet communication with the DCN 240. Herein, there are various kinds of traffic-related signals of the AMC 321, that is, a flow control signal, and a paging request signal for a dormant buffering.

The ARTD 331 transmits a data packet received from an IPC (Inter Processor Communication) mailbox to a PMI task. Besides the data transmission, the ARTD 331 requests a dormant paging, sets flags related to a flow control, and initializes queues when terminating a dormant state. The ARTD 331 does not directly transmit a message (i.e., packet) received at the pNA 343 from the DCN 240 to the AMC 231, but inserts it into a list of queues managed by the YAT 337. The YAT 337 manages the list of activated queues, and transmits data to the AMC 321.

The pNA 343 performs an IP routing. That is, upon receiving an IP packet (i.e., an IP address) over an Ethernet, the pNA 343 determines whether the IP address is an address declared in a PPP device. If it is determined that the IP address is a declared address, the pNA calls a corresponding terminal with a pre-declared function.

Figure 7:
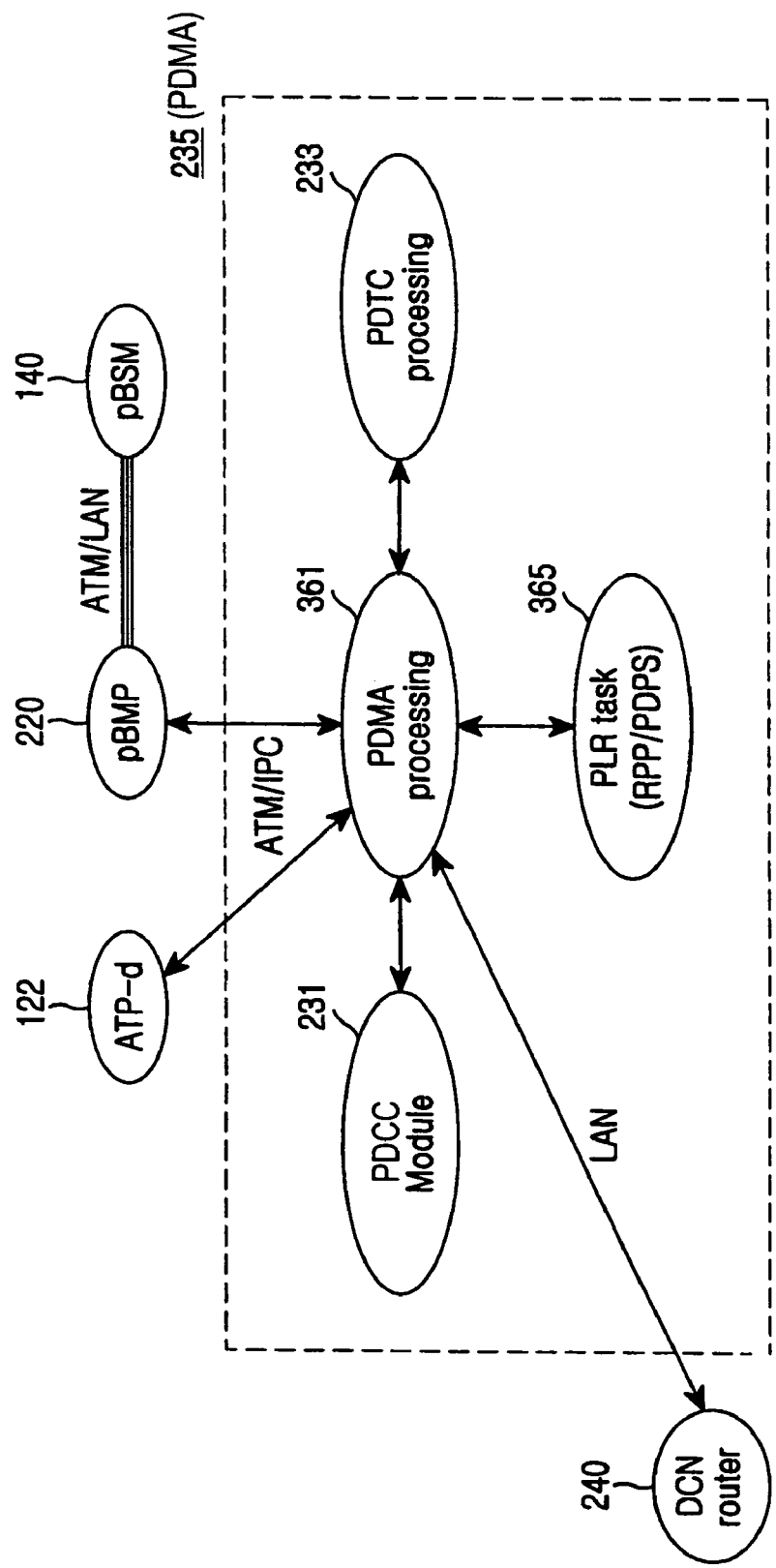
FIG. 7 is a view illustrating an interface configuration between a PDMA (Packet Data Maintenance Administration) module 235 and external blocks in accordance with a preferred embodiment of the present invention.

FIG. 7 is a view illustrating an interface configuration between a PDMA 235 shown in FIG. 4 and external blocks in accordance with a preferred embodiment of the present invention.

Referring to FIG. 7, the PDMA 235 is a module interfaced with O&M function blocks of the BAN 210. Besides the interface with the O&M function blocks, the PDMA 235 checks an ATM PVC state related to the AMC 321, and checks a link state related to the DCN 240. The PDMA 235 receives format data from a block for managing the BAN 210's configuration and format in case of initializing the pPDP 230, and then designates a pPDP format record value. Thereafter, if a block for processing the BAN 210's measurement and statistics periodically requests statistical data, the PDMA 235 reads the pPDP of the PLR and statistical data for each session, and transmits the read data to the block for processing the BAN 210's measurement and statistics. A block for managing the BAN 210's state activates a ping (Packet InterNet Grouper) program to check a state of the pPDP. Therefore, the PDMA 235 replies to the ping request. The PDMA 235 periodically performs the ping process about a link state between the pPDP 230 and the DCN 240, informs a block for managing the BAN 210's interruption of an interruption generation content. Thereafter, the PDMA 235 continuously checks the link state between the pPDP 230 and the DCN 240. If the link state returns to a normal state, the PDMA 235 informs the block for managing the BAN 210's interruption of an interruption release. And, if a diagnosis block of the BAN 210 determines a diagnosis command, the PDMA 235 checks again the link state between the pPDP 230 and the DCN 240, and transmits a diagnosis result signal. Also, the PDMA 235 receives an IP address table from the pBSM 140, stores it, and controls the PDCC 231 to allocate an IP address in a terminal MS.

Figure 9:
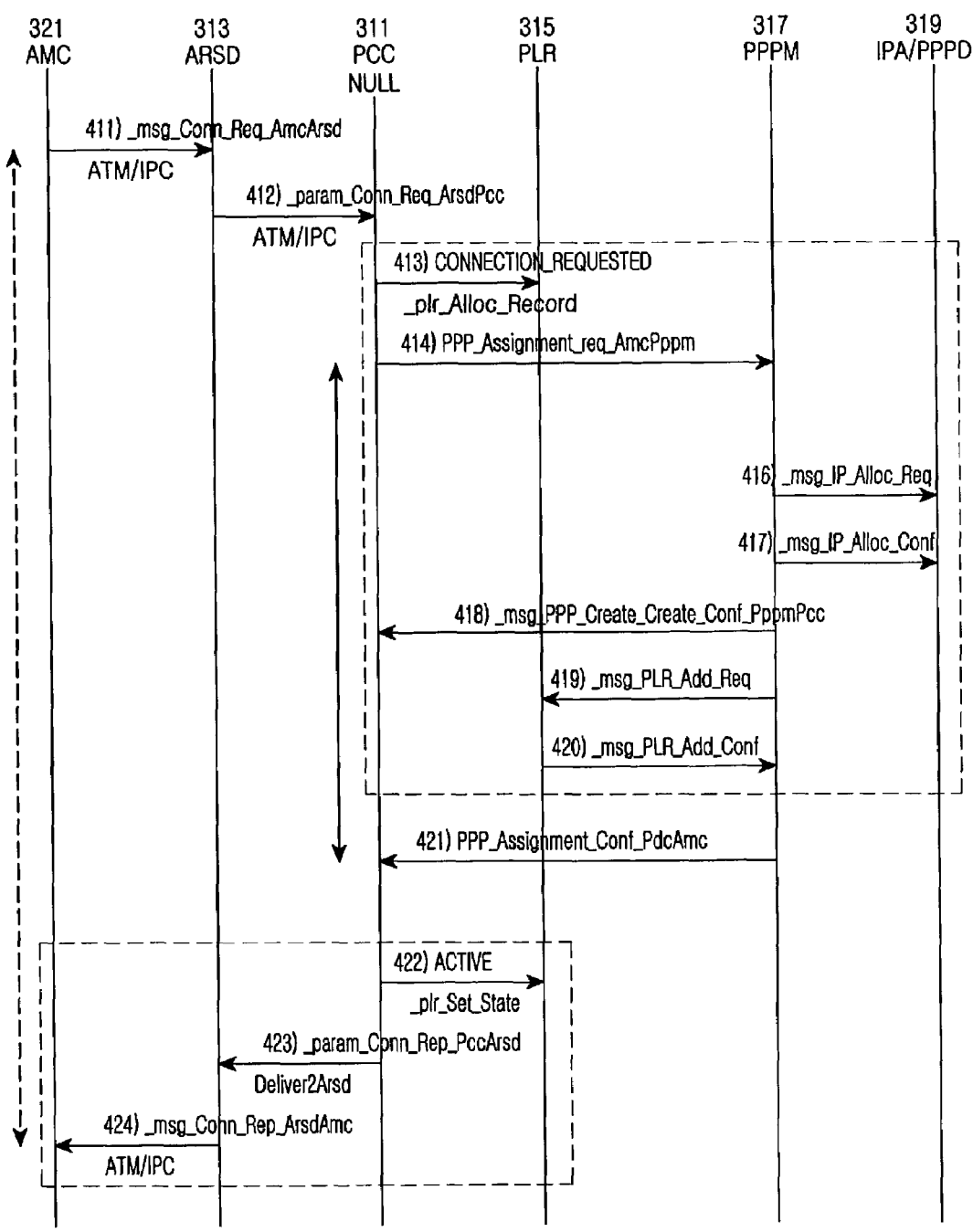
FIG. 9 is a flow chart illustrating a procedure for setting up a packet call in a private wireless Internet communication system in accordance with a preferred embodiment of the present invention.
Figure 10:
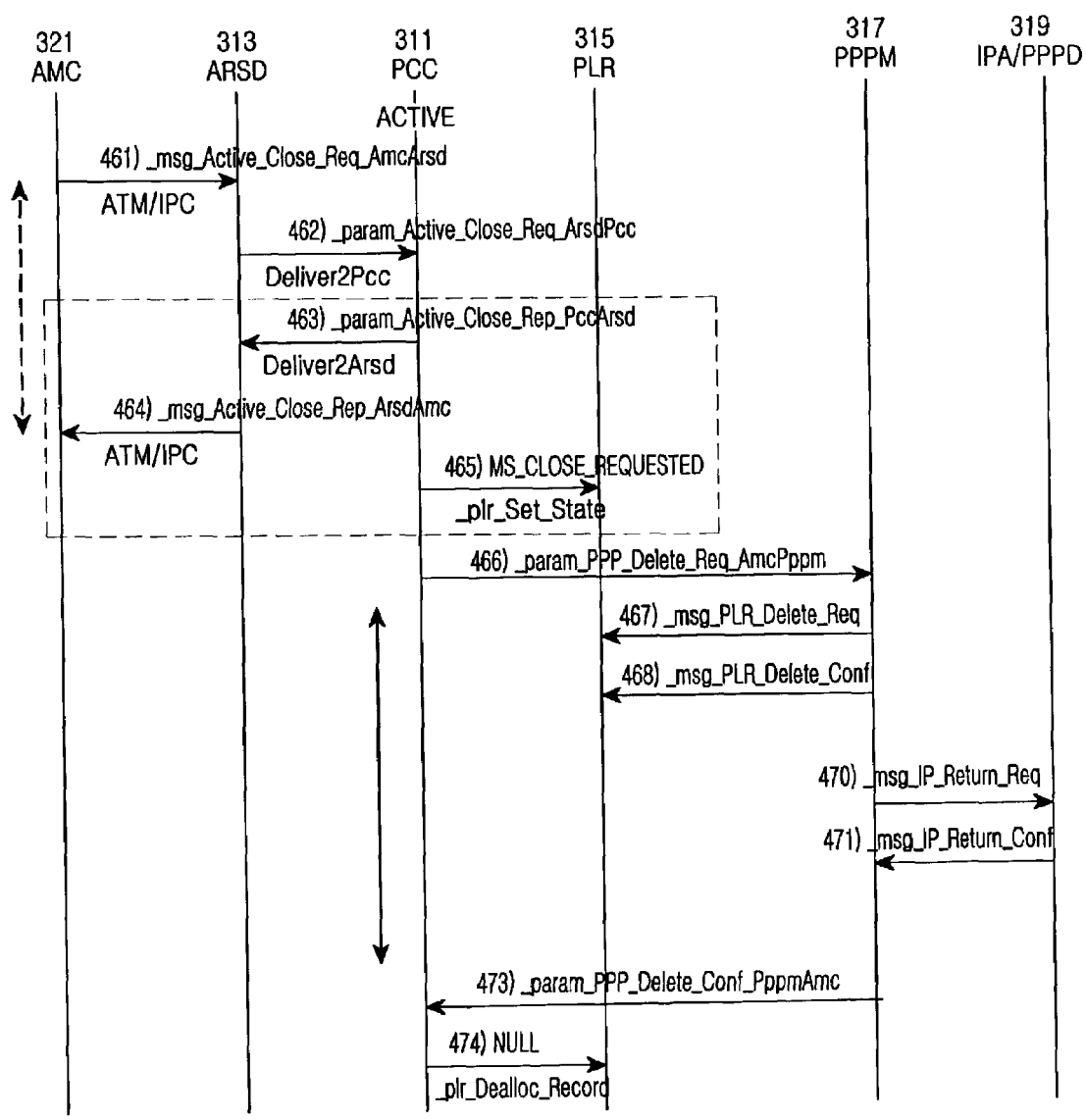
FIG. 10 is a flow chart illustrating a procedure for releasing (i.e., closing) the set-up call in a private wireless Internet communication system in accordance with a preferred embodiment of the present invention.
Figure 11:
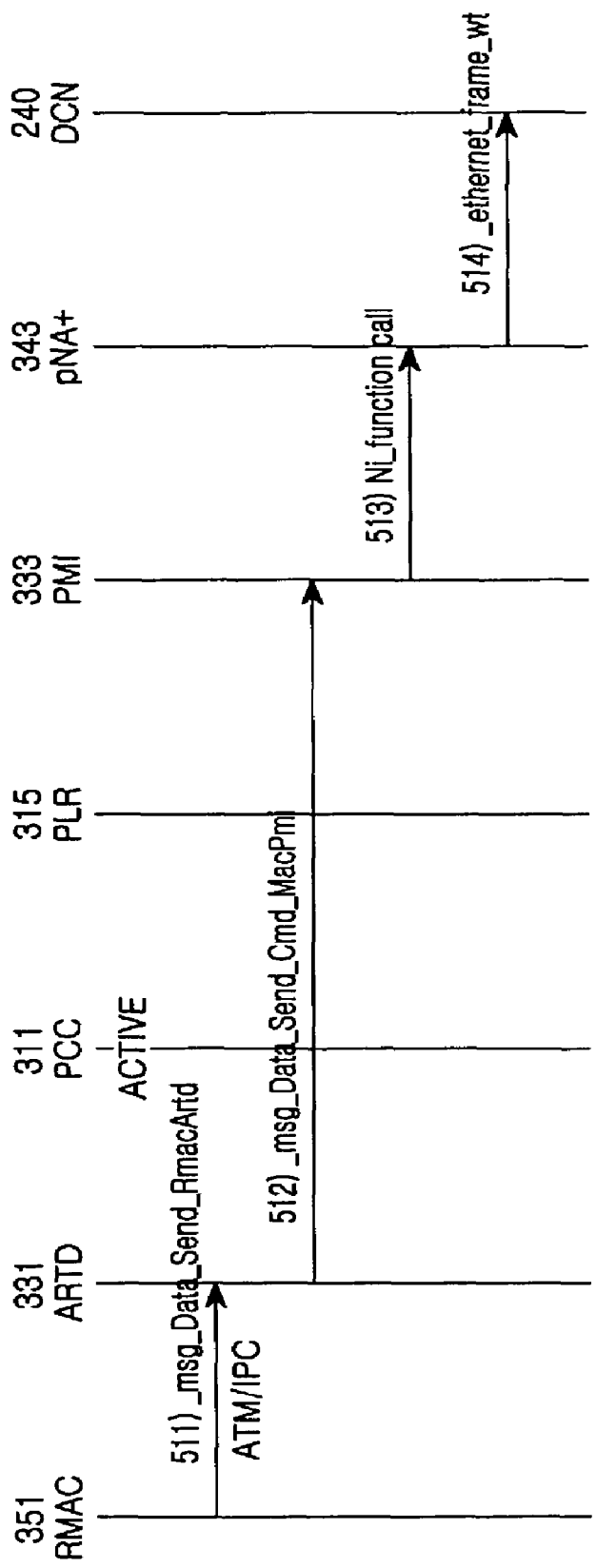
FIG. 11 is a flow chart illustrating a procedure for transmitting packet data from an ATP to a DCN in a private wireless Internet communication system in accordance with a preferred embodiment of the present invention.
Figure 12:
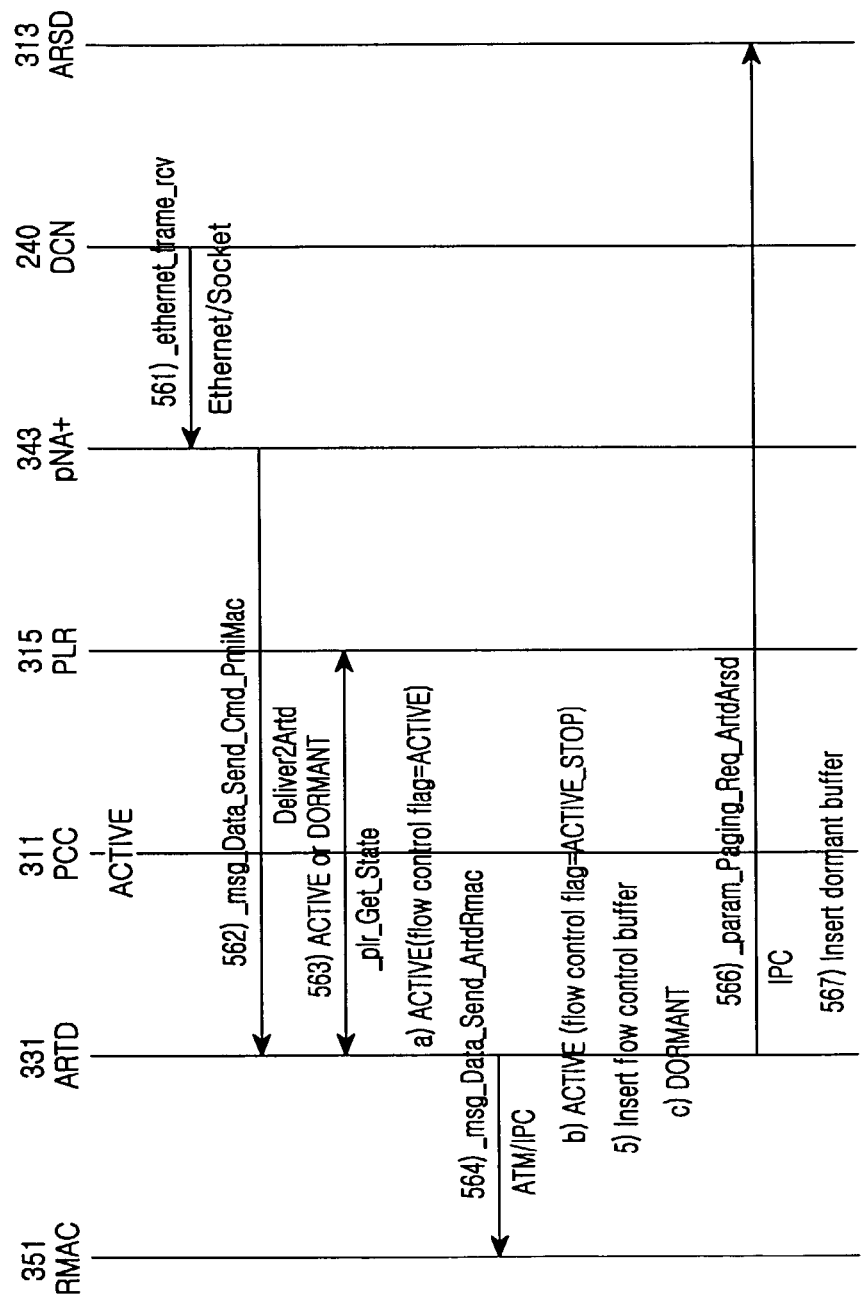
FIG. 12 is a flow chart illustrating a procedure for transmitting packet data from a DCN to an ATP in a private wireless Internet communication system in accordance with a preferred embodiment of the present invention.

FIG. 9 is a flow chart illustrating a procedure for setting up a packet call in a private wireless Internet communication system in accordance with a preferred embodiment of the present invention. FIG. 10 is a flow chart illustrating a procedure for releasing the set-up call in a private wireless Internet communication system in accordance with a preferred embodiment of the present invention. FIG. 11 is a flow chart illustrating a procedure for transmitting packet data from an ATP to a DCN in a private wireless Internet communication system in accordance with a preferred embodiment of the present invention. FIG. 12 is a flow chart illustrating a procedure for transmitting packet data from a DCN to an ATP in a private wireless Internet communication system in accordance with a preferred embodiment of the present invention.

With reference to FIGS. 9-12, an AMC 321 is a call signaling process of an ATP-d 122, a PCC 311 is a state conversion process of a data call. ARSD 313 is a signal process of a pPDP board interfaced with the PCC 311. PLR 315 is a process for storing information concerning an accessed terminal. PPPM 317 and IPA/PPPD 319 are respectively processes for performing a PPP server's maintenance and managing an IP address.

Further, RMAC 351 is a process for processing data of an ATP board, ARTD 331 is a process of a pPDP board interfaced with the RMAC 351, and a PMI 333 is a process for processing data to be transmitted to the PPP server. pNA+ 343 is a pSOS network architecture, and functions as a device driver interworked with an Ethernet hardware device.

FIG. 9 is a flow chart illustrating a procedure for setting up a packet call in a private wireless Internet communication system in accordance with a preferred embodiment of the present invention.

With reference to FIGS. 5 and 9, if a call is generated, the AMC 321 transmits a connection request message to the ARSD 313 at step 411, and the ARSD 313 transmits the connection request message to the PCC 311 at step 412. Then, the PCC 311 transmits the connection request message to the PLR 315 at step 413 simultaneously with transmitting a message for requesting a PPP allocation to the PPPM 317 at step 414. The PPPM 317 transmits a message for requesting an IP allocation to the IPA/PPPD 319 at step 416, and the IPA/PPPD 319 allocates an IP to be used for a terminal MS generating the call and transmits the allocated IP to the PPPM 317 at step 417. If the IP is allocated, the PPPM 317 transmits a message for confirming PPP creation to a PCC 311 at step 418. The PLR 315 transmits a message for requesting a PLL address to the PPPM 317 at step 419, and therefore, the PPPM 317 transmits a message for confirming the PLR address to the PLR 315 at step 420. Thereafter, the PPPM 317 transmits a message for confirming a PPP allocation to the PCC 311 at step 421. According to the aforementioned steps, an IP is allocated to a terminal MS generating a call.

After allocating the IP, the PCC 311 controls the PLR 315 to make a transition to an active state at step 422, and transmits a message for confirming a connection to the ARSD 313 at step 423. After that, the ARSD 313 transmits the connection confirmation message to the AMC 321 at step 424. Likewise, a call control procedure for providing an Internet packet service in a private wireless network is established based on the above steps.

As described above, the steps 411-413 receive messages concerning data call origination, check a corresponding message type, and process a corresponding terminal state ranging from a null state to a connection request state. The steps 414-421 establish interface with a PPP'server in association with a corresponding mobile session (i.e., a packet call), and previously allocate an IP address and then store it. And, the steps 422-424 change a state of a corresponding terminal to an active state, i.e., a connection request state→active state, and reply to a counterpart block requesting the data call.

FIG. 10 is a flow chart illustrating a procedure for releasing the set-up call in a private wireless Internet communication system in accordance with a preferred embodiment of the present invention.

With reference to FIGS. 5 and 10, the PCC 311 maintains an active state during a packet communication. In this case, a packet release (i.e., close) request is generated, the AMC 321 transmits a message for requesting a packet release to the ARSD 313 at step 461, and the ARSD 313 transmits a message for requesting release of active state parameters to the PCC 311 at step 462. Then, the PCC 311 transmits a response message in response to the release request message at step 463, and the ARSD 313 transmits a message in response to a received response message to the AMC 321 at step 464.

Thereafter, the PCC 311 transmits a message for requesting a call release of a mobile station MS to the PLR 315 at step 465, and at the same time transmits a message for requesting a PPP release to the PPPM 317 at step 466. Therefore, the PPPM 317 transmits a message for requesting PLR deletion to the PLR 315 at step 467. Upon receiving the PLR deletion message, the PLR 315 deletes the PLR and then transmits a message for confirming the PLR deletion to the PPPM 317 at step 468. Also, the PPPM 317 transmits a message for requesting an IP return (i.e., an IP restoration) to the IPA/PPPD 319 at step 470, the IPA/PPPD 319 restores the IP and transmits a message for confirming the IP restoration to the PPPM 317 at step 471. Then, the PPPM 317 transmits a message for confirming the deletion of the PPP to the PCC 311 at step 473, and the PCC 311 releases a record of the PLR at step 474 and terminates a call release procedure.

As described above, a message type for a call release is checked in the steps 464-464, and a response signal having information (i.e., parameters) stored in a corresponding terminal is transmitted to a counterpart block. Then, a corresponding terminal's state is changed to another state at step 465, and the steps 466-473 release information related to both a PPP server and a database of a corresponding terminal. Thereafter, a state of the corresponding terminal is changed at step 474 and then a program is terminated.

FIG. 11 is a flow chart illustrating a procedure for transmitting packet data from an ATP-d 122 shown in FIG. 2 to a DCN 240 in a private wireless Internet communication system in accordance with a preferred embodiment of the present invention.

With reference to FIGS. 6 and 11, the RMAC 351 transmits a packet data to the ARTD 313 at step 511, and the ARTD 331 commands the PMI 333 to transmit the packet data at step 512. Upon receiving the packet data, the PMI 333 transmits an IP packet message to the pNA+ 343 at step 513, and the pNA+ 343 converts the IP packet to an Ethernet frame and transmits the converted IP packet to the DCN 240.

As described above, the pPDP 230 receives data from the ATP-d 122, and transmits the received data to a previous stage of the PPP server at steps 511-512. Then, the step 513 performs a decoding via the PPP server and transmits the decoding result to the pNA+ 343 in the form of an IP packet, and the step 514 transmits it via a physical Ethernet device in the form of a frame.

FIG. 12 is a flow chart illustrating a procedure for transmitting packet data from a DCN to an ATP in a private wireless Internet communication system in accordance with a preferred embodiment of the present invention.

With reference to FIGS. 6 and 12, the DCN 240 transmits an Ethernet frame message to the pNA+ 343 at step 240, and the pNA+ 343 converts the Ethernet frame message to an IP packet and commands the ARTD 331 to transmit the message at step 562. In this case, the PCC 311 may control the terminal MS to be at an active state or a dormant state at step 563. Herein, the state of the terminal MS determines one of the active state and the dormant state on the basis of the information of a flow control flag of the PLR 315. If the terminal MS is at an active state, the ARTD 331 transmits a message to the RMAC 351 at step 564. If the terminal MS is an active stop state, the ARTD 331 stores a message in a flow control buffer. Also, if the terminal MS is at a dormant state, the ARTD 331 requests a paging request parameter of the ARSD 313 and stores the paging request parameters in a dormant buffer at step 567.

As described above, the step 561 receives a frame from a network (e.g., Ethernet), and transmits the frame to the pNA+ 343. The step 562 transmits it to the ARTD 331 interfaced with the ATP-d 122 for data transmission. The step 563 checks state information based on the PLR 315 storing a current terminal's state. Thereafter, if a physical connection between corresponding process blocks of the terminal is established (i.e., active state) at step 564, data are transmitted to a corresponding terminal. But, if a physical connection between them is interrupted (i.e., dormant state) at step 564, the steps 566 and 567 store a corresponding state in an internal buffer, and perform a signaling process to recognize a terminal's position (i.e., to set up a connection again).

As apparent from the above description, the present invention implements a private wireless Internet network for providing a high-speed radio packet data service using a CDMA scheme, and provides services having specific uses (such as a non-authentication, a non-accounting, and a simple IP service, etc.) over an private wireless Internet network. As a result, the present invention cuts down the expense of using the private wireless Internet communication system, supports a high-speed packet data service, and allows easy upgrade of a system version.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus, comprising:
a plurality of private BTSs (Base Transceiver Systems) allocating a wireless resource to a plurality of mobile terminals positioned in an office packet data service area, and performing a radio communication with the terminals; and
a private BSC (Base Station Controller) for providing CDMA service comprising a packet data service when calls requested by the private BTSs correspond to office packet service request signals,
the private BSC comprising:
a BMP hardware board having a software block determining whether a number dialed by one of said plurality of mobile stations is a private or a public call and whether said number is for a telephone or for an internet connection;

an ATP-d (Air Termination Processor board) for controlling radio packet data and signals of the private BSC and processing generation of the radio packet data and signals; and a pPDP (private Packet Data Processor) connected between the private BSC and a DCN (Data Core network), said pPDP providing said private radio packet service, wherein the pPDP comprises:

a PDCC (Packet Data call Controller) allocating/releasing an IP (Internet Protocol) needed to establish packet data transmission/reception of a terminal between an ATP-d and the DCN, managing generation/termination of a RP (Radio Packet) connection, and processing a state concerning a packet call;

a PDTC (Packet Data Traffic Controller) performing packet data transmission/reception between the ATP-d and the DCN; and a PDMA (Packet Data Maintenance & Administration part) for checking an interface with the private BSC and a state of the interface.

2. The apparatus of claim 1, the PDCC comprises:

a signaling daemon processor processing messages related to a data service of a terminal, messages related to a time used in a packet control controller, and messages used for processing data of the terminal in a dormant state;

a packet call controller controlling a state of each packet call, and controlling a state transition of a corresponding terminal upon receiving a predetermined message; and a packet location register processor managing state conversion information of a terminal by the packet call controller, and transmitting the state conversion information to each module in the form of a functional API (Application Program Interface).

3. The apparatus of claim 1, the PDTC comprises:

a traffic daemon processor transmitting a received data packet to a PMI task, requesting a dormant paging, setting flags related to a program flow control, initializing queues when terminating a dormant state, and thus processing signaling operations related to an AMC (ATP Mac Control, ATP:Air Termination Processor) and traffic;

a data transmission part managing a list of the queues, and transmitting a message of the queues to the AMC;

a PMI processor receiving LCP/IPCP/IP protocol frames from a terminal, and processing them; and a network processor for performing an Ethernet packet communication with the DCN.

4. A method for providing for private and public packet data Internet access service and private and public phone services to a mobile station in communication with a private BTS in an Internet communication system, said method comprising the steps of:

allocating/releasing an IP (Internet Protocol) needed to establish packet data transmission/reception of said mobile station between an ATP-d (Air Termination Processor board) and the DCN (Data Core network), managing generation/termination of a RP (Radio Packet) connection, and processing a state conversion concerning a packet call;

performing data transmission/reception between an AMC and the DCN; and performing an interface between a BAN (BSC ATM Network) and maintenance/administration blocks, checking states of the AMC (ATP Mac Control, ATP: Air Termination Processor) and an ATM PVC (Asynchronous Transfer Mode Permanent Virtual Circuit), and checking a link state between the AMC and the DCN, when a dialing number of a call requested by the private BTS is not an private packet service request signal, the call information is transmitted to a public network BSC; and when a dialing number of a call requested by the private BTS is a private packet service request signal, the call receives the public packet data Internet access service absent authentication and absent accounting.

5. The method of claim 4, said Internet communication system comprising:

a plurality of BTSs (Base Transceiver Systems) allocating a wireless resource to terminals positioned in an private packet data service area and performing a radio communication with the mobile station; and a private BSC (Base Station Controller) providing a packet data service when calls requested by the private BTS corresponds to private packet service request signals, the private BSC comprising a BMP processing a radio call and determining whether a call placed by said mobile station is a private call or public call by analyzing a phone number received from the mobile station;

an ATP-d (Air Termination Processor board) controlling radio packet data and signals of the private BSC, and processing generation of the radio packet data and signals; and a pPDP (private Packet Data Processor) connected between the private BSC and a DCN (Data Core network) providing the private radio packet service.

6. The method of claim 4, when a dialing number of a call requested by the private BTS is a private packet service request signal, the call is routed through a gateway in order to connect with the Internet.

7. The method of claim 4, wherein calls to the public Internet from said mobile station absent said authentication and accounting are accomplished without being routed through a public mobile communications network.

8. An apparatus, comprising:

a private BTS;

a mobile station in wireless communication with said private BTS; and a private BSC connected to said private BTS, said private BSC connected to a gateway, said gateway connected to an intranet and the public Internet, said gateway enabling said mobile station access to the public Internet via a private mobile network absent authentication and absent accounting, said private BSC connected to a public BSC enabling said mobile station to have access to a public mobile network, said private BSC comprising:

a BAN (BSC ATM network); and an ATP-d (air terminal processor board).

9. The apparatus of claim 8, said private BSC further comprising a radio packet connection disposed between said BAN and said gateway.

10. The apparatus of claim 9, said apparatus further comprising a hub switch disposed between said private BSC and said gateway.

11. The apparatus of claim 8, said private BSC further comprises a BMP discerning whether a number dialed by said mobile station needs the attention of said public BSC.

12. The apparatus of claim 8, said private BSC further comprises a BMP discerning whether a number dialed by said mobile station requires Internet services or not.

13. The apparatus of claim 8, when said public BSC is not accessed during a call from a mobile station, the call is absent authentication and accounting.

14. The apparatus of claim 8, said apparatus being adapted to allow for calls from the mobile station in communication with the private BTS to the Internet to be accomplished without accounting and without authorization.

15. The apparatus of claim 8, the apparatus being adapted to provide public Internet service to said mobile station via said gateway and without using said public mobile network.

16. The apparatus of claim 8, each call from said mobile station being routed through one of the public mobile network, the gateway to the public Internet and within the private BTS based on a number dialed at said mobile station.

* * * * *